(12) United States Patent
Bosnar

(10) Patent No.: US 9,477,004 B2
(45) Date of Patent: Oct. 25, 2016

(54) DUAL COIL FOR ELECTROMAGNETIC SOUNDING OF LAYERED EARTH

(71) Applicant: Geonics Limited, Mississauga (CA)

(72) Inventor: Miroslav Bosnar, Toronto (CA)

(73) Assignee: Geonics Limited (CA)

( * ) Notice: Subject to any disclaimer, the term of this patent is extended or adjusted under 35 U.S.C. 154(b) by 364 days.

(21) Appl. No.: 14/162,925

(22) Filed: Jan. 24, 2014

(65) Prior Publication Data

US 2015/0048833 A1    Feb. 19, 2015

Related U.S. Application Data

(60) Provisional application No. 61/865,241, filed on Aug. 13, 2013, provisional application No. 61/873,576, filed on Sep. 4, 2013.

(51) Int. Cl.
*G01V 3/10* (2006.01)
*G01V 3/165* (2006.01)
*G01V 3/28* (2006.01)

(52) U.S. Cl.
CPC .................................. *G01V 3/104* (2013.01)

(58) Field of Classification Search
CPC ........... G01V 3/10; G01V 3/165; G01V 3/28
USPC ......... 324/336, 334, 343, 326, 329; 702/2, 7
See application file for complete search history.

(56) References Cited

U.S. PATENT DOCUMENTS

| | | | | |
|---|---|---|---|---|
| 7,443,154 B1* | 10/2008 | Merewether | ........... | G01V 3/104 324/67 |
| 2003/0094952 A1* | 5/2003 | Morrison | ................. | G01V 3/17 324/330 |
| 2009/0251145 A1* | 10/2009 | Kaneko | ............ | G01R 33/34046 324/318 |
| 2010/0188089 A1* | 7/2010 | Kuzmin | ................. | G01V 3/165 324/330 |
| 2010/0237870 A1* | 9/2010 | Dodds | ...................... | G01V 3/16 324/331 |

OTHER PUBLICATIONS

Geonics Limited, Technical Note TN-27, "Principles and Application of Time Domain Electromagnetic Techniques for Resistivity Sounding", J.D. McNeill, Jul. 1994.

* cited by examiner

*Primary Examiner* — Tung X Nguyen
*Assistant Examiner* — Neel Shah
(74) *Attorney, Agent, or Firm* — Dureska & Moore LLC; David P. Dureska; Greg Strugalski

(57) ABSTRACT

Methods and systems for measuring subsurface electrical conductivity, using first and second sensor coils. The second sensor coil has a smaller effective area and a greater bandwidth than the first sensor coil. The first and second sensor coils are positioned with respect to each other to achieve zero or near zero mutual inductance.

19 Claims, 12 Drawing Sheets

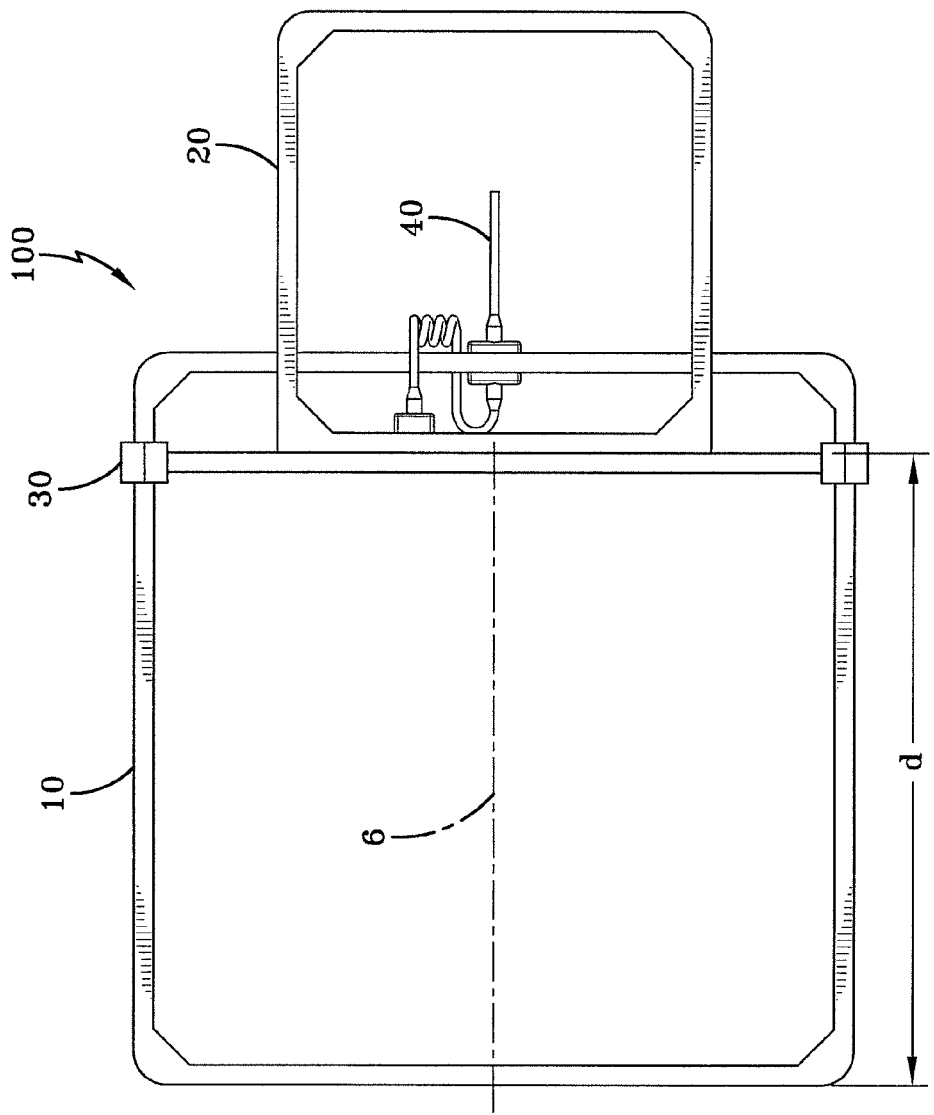
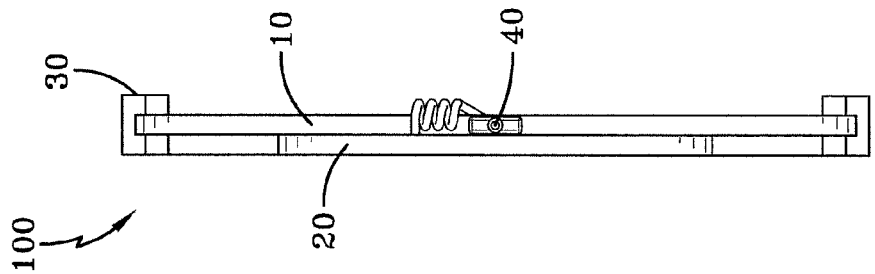
FIG-7A
FIG-7B

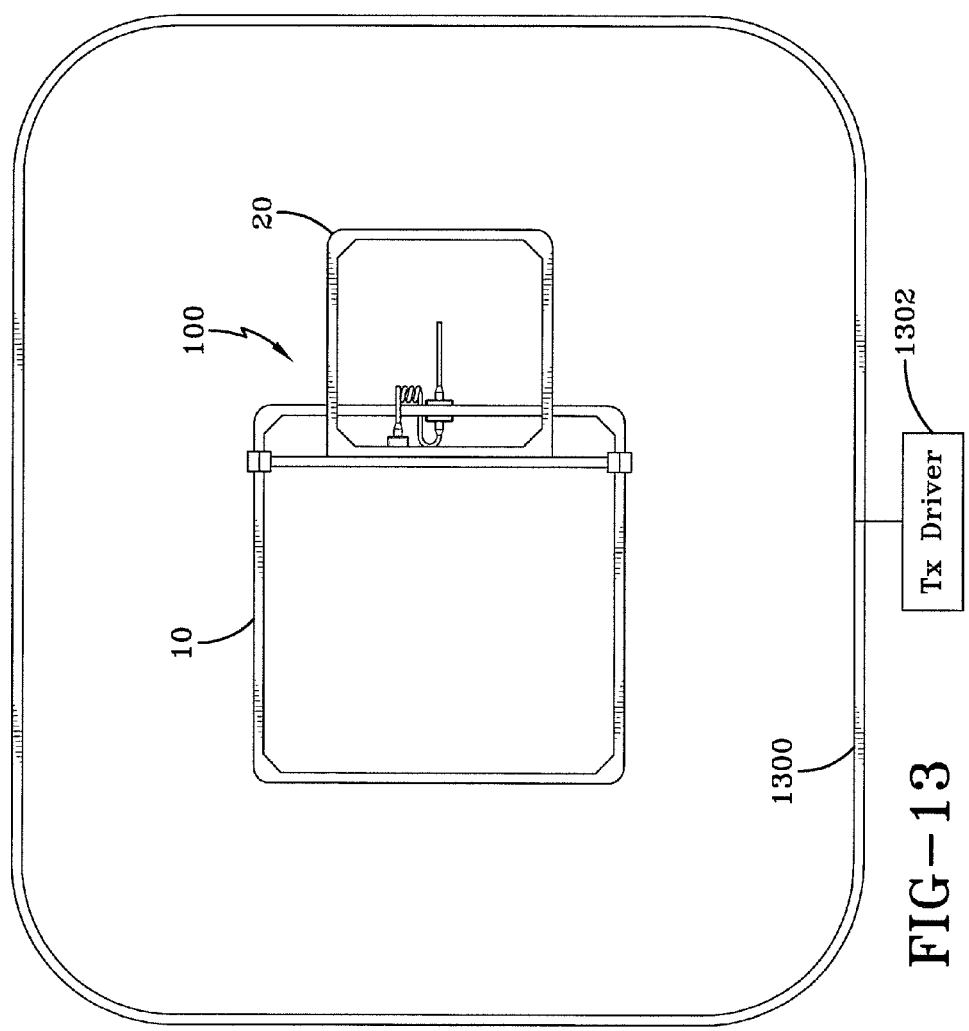

DUAL COIL FOR ELECTROMAGNETIC SOUNDING OF LAYERED EARTH

CROSS-REFERENCE TO RELATED APPLICATIONS

The present disclosure claims priority from U.S. provisional patent applications No. 61/865,241, filed Aug. 13, 2013; and U.S. provisional patent application No. 61/873,576, filed Sep. 4, 2013; the entireties of which are hereby incorporated by reference.

FIELD

The present disclosure is generally related to devices for investigation of electrical conductivity of ground subsurface layers.

BACKGROUND

In the application of electromagnetic technique for investigation of electrical conductivity of ground subsurface layers, it is often necessary to use an inductive sensor with very large dynamic range in terms of bandwidth and effective area. Unfortunately, requirements of large effective area and wide bandwidth are typically difficult to achieve in a practical-size single sensor. Therefore, to achieve these requirements, typically two separate sensors (typically separate coils) are used, one with a large bandwidth but small effective area, and one with large effective area but small bandwidth. The results of measurement using the two separate sensors are later combined.

The procedure using two sensors is typically to perform the measurement using two coils such that during the measuring cycle, the two coils are separated by a substantial distance so that they do not affect interfere with each other. Since in most cases it is desirable that measurements with two coils are performed at the same place, the two measurements using the two coils cannot be performed simultaneously.

SUMMARY

In various examples, the present disclosure provides a device for measuring subsurface electrical conductivity, where the device may include: a first sensor coil having a first effective area and a first bandwidth; and a second sensor coil having a second effective area smaller than the first effective area and a second bandwidth greater than the first bandwidth; wherein the second sensor coil is coupled to the first sensor coil at a position overlapping with the first sensor coil and at a position where mutual inductance between the first and second sensor coils is substantially zero.

In some examples, the present disclosure provides a method of measuring subsurface electrical conductivity of a target site, where method may include: positioning a first sensor coil to measure electrical conductivity of the target site, the first sensor coil having a first effective area and a first bandwidth; positioning a second sensor coil to measure electrical conductivity of the target site, the second sensor coil having a second effective area smaller than the first effective area and a second bandwidth greater than the first bandwidth; the first and second sensor coils being positioned with respect to each other to reduce mutual inductance between the first and second sensor coils to substantially zero; and while keeping both the first and second sensor coils in position, obtaining measurements of electrical conductivity from the first and second sensor coils. In some examples, the second sensor coil may overlap with the first sensor coil.

BRIEF DESCRIPTION OF THE DRAWINGS

Reference will now be made, by way of example, to the accompanying drawings which show example embodiments of the present application, and in which:

FIGS. 7A and 7B are top and side views of an example device for measuring subsurface electrical conductivity;

FIG. 13 is a schematic top view of the device of FIGS. 7A and 7B incorporated into an active electromagnetic sounding apparatus, according to an example embodiment.

Similar reference numerals may be used in different figures to denote similar components.

DETAILED DESCRIPTION

In various examples, the present disclosure provides methods and devices where two coils may be provided on a single platform, in close proximity to each other, without electrically affecting each other. The present disclosure may thus allow for measuring with two coils simultaneously.

Interference between two conventional coils is the result of their non-zero mutual inductance or mutual coupling. The coils affect the characteristics of each other and therefore affect results of measurements using the coils.

Mutual inductance between two coils can be reduced to zero or near zero by various methods, for example by large separation between the two coils or by special geometrical arrangement of the two coils. The present disclosure, in various examples, uses relative positioning of the two coils to achieve substantially zero mutual inductance without having to separate the two coils by large distances.

Figure 1:
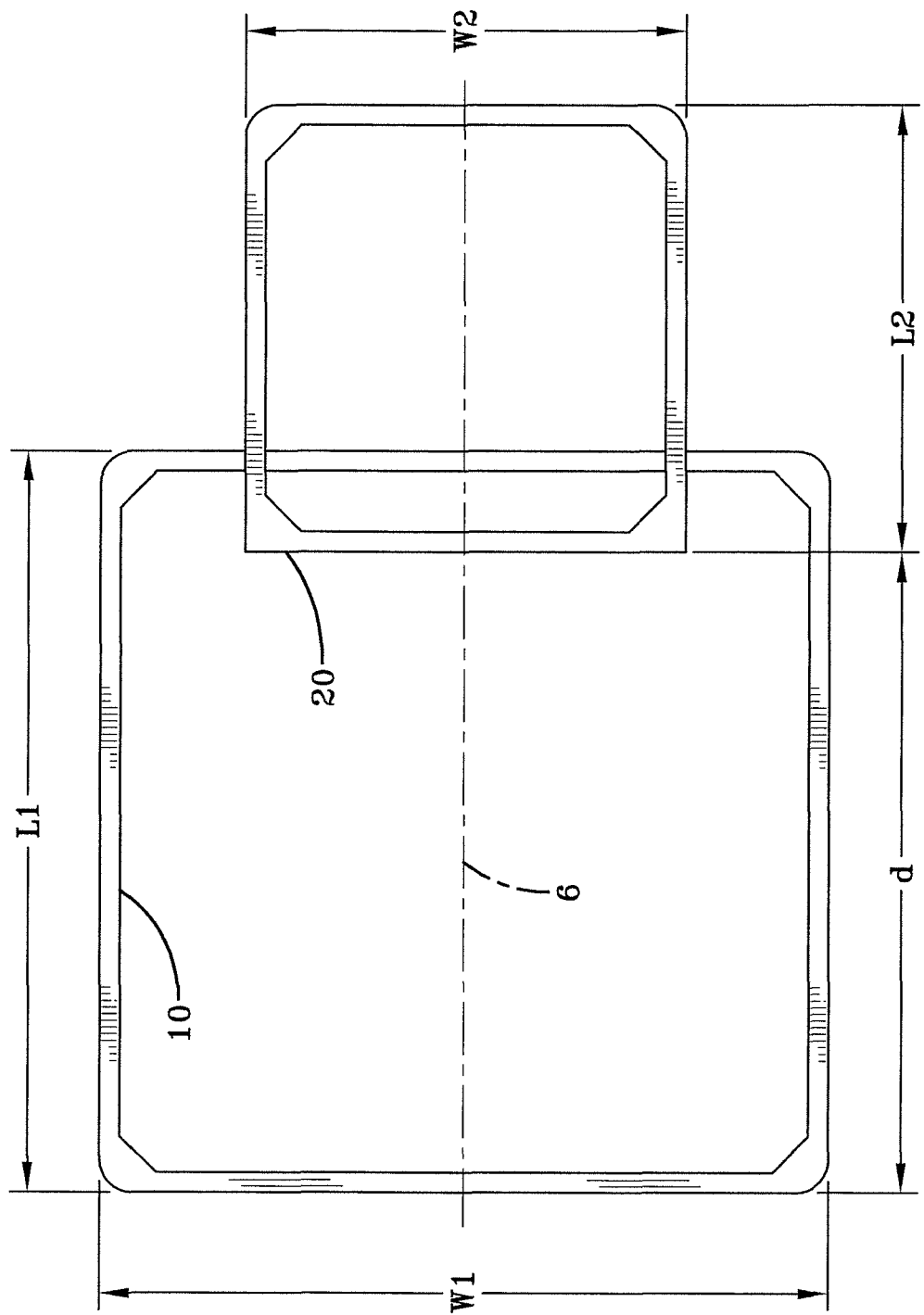
FIG. 1 shows example first and second sensor coils positioned for measuring subsurface electrical conductivity.

FIG. 1 shows an example arrangement of sensor coils for measuring subsurface electrical conductivity. A first sensor coil 10 has a first effective area and a first bandwidth. For example, where the first coil 10 has a large number of turns, the first coil 10 has high effective area but small bandwidth. A second sensor coil 20 has a second effective area and a second bandwidth. For example, where the second coil 20 has a smaller number of turns compared to the first coil 10, the second coil 20 has a smaller effective area but higher bandwidth compared to the first coil 10.

The first and second coils 10, 20 are shown as square coils. However, other configurations may be suitable (e.g., circular, rectangular or other coil shapes). The first and second coils 10, 20 may have any suitable size and dimensions, for example in order to achieve desired effective areas and/or bandwidths. In some examples, the first coil 10 may have length L1 and width W1 in the range of about 50 cm to about 200 cm, for example about 100 cm×100 cm. The second coil 20 may have length L2 and width W2 in the range of about 20 cm to about 150 cm, for example about 60 cm×60 cm.

The first and second coils 10, 20 may be positioned relative to each other such that their mutual inductance is zero. For example, the first and second coils 10, 20 may be positioned to overlap each other while achieving substantially zero mutual inductance. For example, the first and second coils 10, 20 may be positioned to share a common longitudinal axis 6 passing through their respective centers. The amount by which the first and second coils 10, 20 overlap each other may be measured as the separation d between the respective trailing edges of the first and second coils 10, 20. In the examples described herein, the amount of mutual inductance between the first and second coils 10, 20 is dependent on the amount of separation d. Thus, the separation d may be a variable that may be adjusted as appropriate in order to achieve zero or near zero mutual inductance. In an example embodiment, a zero or near zero mutual inductance is an inductance that meets the following criteria: $M_{TOT} \leq 2 \cdot N_1 \cdot N_2$ (nH), where N1 and N2 are the number of turns of the first coil 10 and the second coil 20, respectively, and $M_{TOT}$ is the total mutual inductance of the two coils 10, 20.

The relative positioning of the first and second coils 10, 20 may be derived by appropriate calculation of mutual inductance and/or by experimental method. Some examples are described below, for the purposes of illustration only. Other methods for determining the appropriate separation d may be suitable.

Experimental Method

In some examples, the relative positioning of the first and second coils 10, 20 in order to achieve substantially zero mutual inductance may be determined through experiment.

Figure 2:
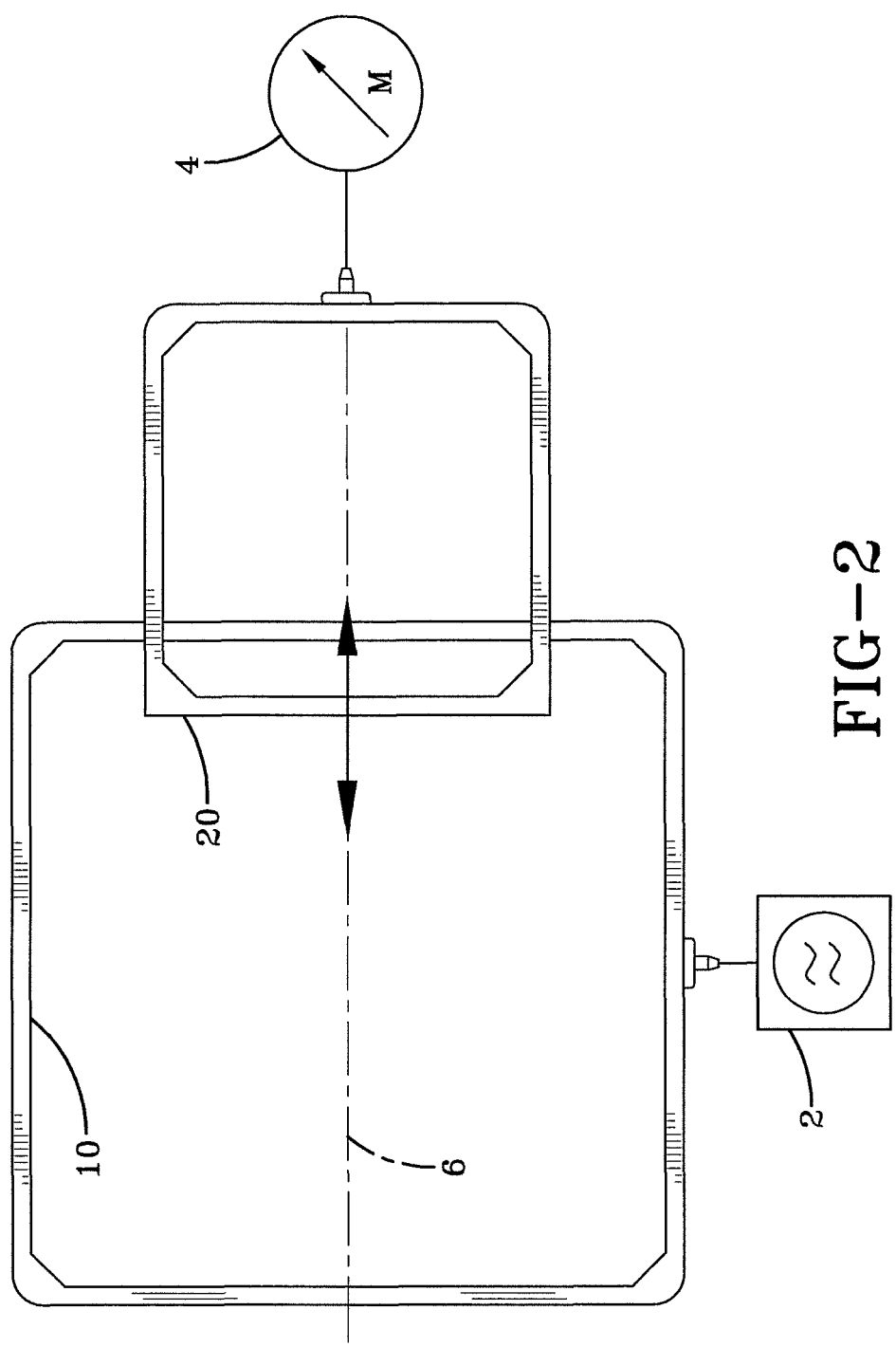
FIG. 2 is a diagram illustrating an example method for positioning sensor coils for measuring subsurface electrical conductivity.

An example experimental method is shown in FIG. 2. In this method, the first and second coils 10, 20 may be initially positioned as illustrated in FIG. 1, with a certain amount of initial separation d. In another example, the first and second coils 10, 20 may be initially positioned to share a common center. Alternatively, the first and second coils 10, 20 may be initially positioned with no overlap.

A signal (e.g., a sinusoidal signal or other suitable signal) may then be applied (e.g., using a signal generator 2) to the first coil 10. Signal output from the second coil 20 may be measured by a signal measuring device 4 (e.g., a meter or an oscilloscope). If there is mutual inductance between the first and second coils 10, 20, the signal applied to the first coil 10 will be at least partially picked up by the second coil 20. Thus, non-zero signal output measured from the second coil 20 may indicate there is non-zero mutual inductance between the first and second coils 10, 20.

The second coil 20 may then be moved relative to the first coil 10, thus adjusting the separation d, until the output measured by the signal measuring device 4 (which in FIG. 2 is a volt meter) is at or near zero. For example, the second coil 20 may be initially positioned such that the first and second coils 10, 20 share a common center. The second coil 20 may be moved by moving the second coil 20 along and substantially parallel to the common longitudinal axis 6, for example, as indicated by the arrows in FIG. 2. In an example embodiment, the output signal ($e_{20}$) is at or near zero when the following criteria is met: $e_{20} \leq \pm 2 \cdot N_1 \cdot N_2 \cdot I_{10}$ (nV), where $I_{10}$ is a current in the coil 10.

Figure 3:
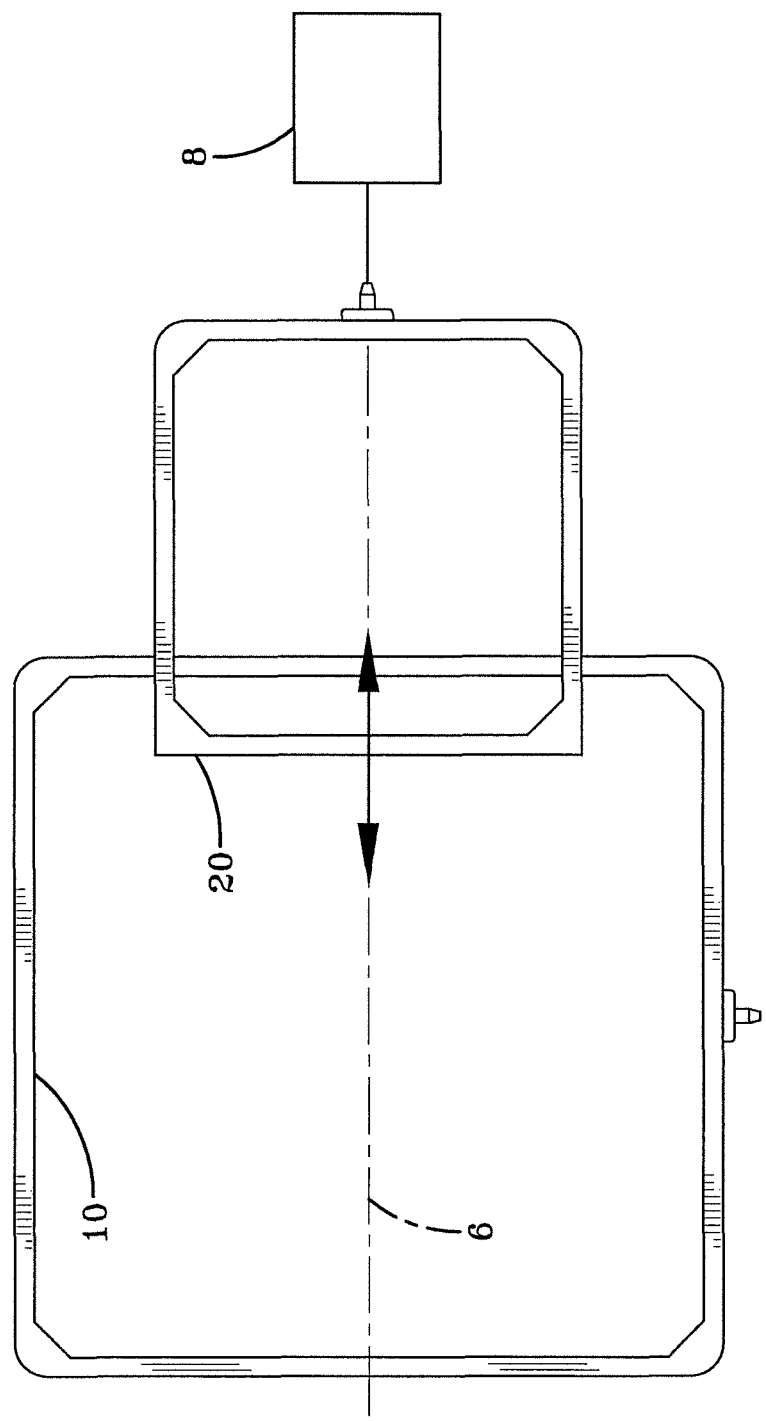
FIG. 3 is a diagram illustrating another example method for positioning sensor coils for measuring subsurface electrical conductivity.

Another example experimental method is shown in FIG. 3. This method may be similar to that shown in FIG. 2, however rather than using a signal generator 2 and a signal measuring device 4, an inductance meter 8 (e.g., an LCR meter) may be used to measure inductance of the first coil 10. The initial inductance of the first coil 10 may be first measured prior to introduction of the second coil 20, to obtain an initial value. The second coil 20 may be then subsequently positioned overlapping with the first coil 10 and moved relative to the first coil 10 (e.g., as described above) until the inductance of the first coil 10, as measured by the inductance meter 8, returns to the initial value or is substantially equal to the initial value. A similar process may be carried out in which the initial inductance of the second coil 20 is measured instead (e.g., the inductance meter 8 is used to measure inductance of the second coil 20 instead of the first coil 10), and the second coil 20 is positioned until the measured inductance returns to the initial value or is substantially equal to the initial value.

Although the example experimental methods describe moving the second coil 20 with respect to the first coil 10, in some examples the second coil 20 may be kept stationary while the first coil 10 is moved.

Once the desired positioning of the first and second coils 10, 20 has been achieved, the separation d may be recorded for future reference. If the first and second coils 10, 20 are positioned over a target site for subsurface sounding, measurements of subsurface electrical conductivity may be taken from the coils 10, 20.

Calculation Method

In some examples, the relative positioning of the first and second coils 10, 20 in order to achieve substantially zero mutual inductance may be determined through suitable calculations. Such calculations may be used in place of or in addition to the experimental method described above.

Figure 4:
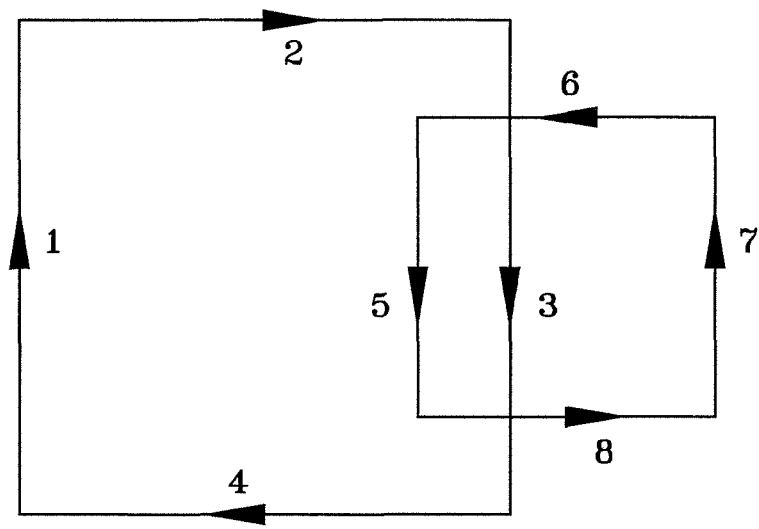
FIG. 4 is a schematic diagram illustrating coil filaments for an example calculation of mutual inductance between two coils.
Figure 5:
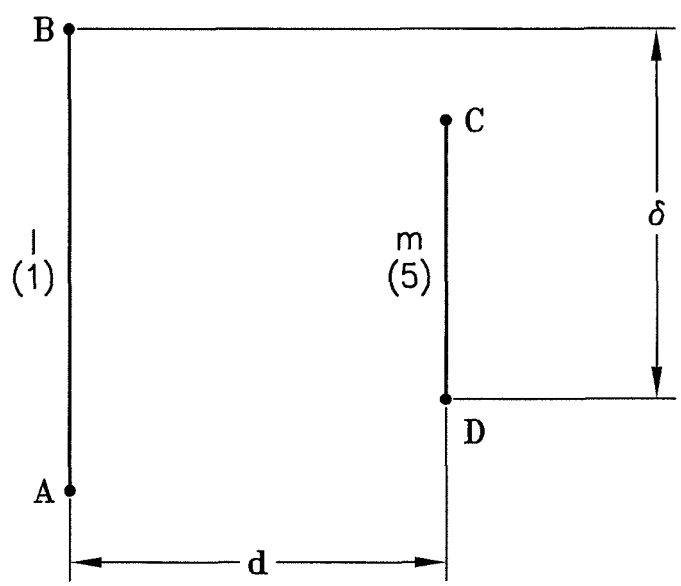
FIG. 5 is a schematic diagram illustrating an example calculation of mutual inductance between two coil filaments.

Example calculations are now described with reference to FIGS. 4 and 5. FIG. 4 schematically shows coil filaments used to calculate mutual inductance between the first and second coils 10, 20. Coil filaments 1 to 4 correspond to the first coil 10 and coil filaments 5 to 8 correspond to the second coil 20.

Total mutual inductance of the two coils 10, 20 may be calculated as a sum of mutual inductance of the coil filaments, multiplied by the number of turns of each coil 10, 20:

$$M_{TOT} = N_1 \cdot N_2 \cdot (-M_{1,5} + M_{1,7} - M_{2,6} + M_{2,8} + M_{3,5} - M_{3,7} + M_{4,6} - M_{4,8})$$

where $M_{x,y}$ is the mutual impedance between filament x of the first coil 10 and filament y of the second coil 20. For example, $M_{1,5}$ is the mutual impedance between filament 1 of the first coil 10 and filament 5 of the second coil. $N_1$ and $N_2$ are the number of turns of the first coil 10 and the second coil 20, respectively. $M_{TOT}$ is the total mutual inductance of the two coils 10, 20.

In this example, $M_{2,6} - M_{2,8} = M_{4,6} - M_{4,8}$

Thus, the equation may be simplified as:

$$M_{TOT} = N_1 \cdot N_2 \cdot (M_{1,7} + M_{3,5} + 2M_{2,8} - M_{3,7} - 2M_{2,6} - M_{1,5})$$

In an example where the first coil 10 is a 100 cm×100 cm square coil and the second coil 20 is a 60 cm×60 cm square coil, an example calculation for $M_{1,5}$ is provided below:

$$M_{1,5}(d) = 0.001 \cdot \left[ \alpha \cdot \mathrm{asinh}\left(\frac{\alpha}{d1(d)}\right) - \beta \cdot \mathrm{asinh}\left(\frac{\beta}{d1(d)}\right) - \right.$$

$$\gamma \cdot \mathrm{asinh}\left(\frac{\gamma}{d1(d)}\right) + \delta \cdot \left(\frac{\delta}{d1(d)}\right) - (\alpha^2 + d1(d)^2)^{0.5} +$$

$$\left. (\beta^2 + d1(d)^2)^{0.5} + (\gamma^2 + d1(d)^2)^{0.5} - (\delta^2 + d1(d)^2)^{0.5} \right] (\mu H)$$

$$\alpha = l + m - \delta$$

$$\beta = l - \delta$$

$$\gamma = m - \delta$$

where l is the length of filament 1 (in cm), m is the length of filament 5 (in cm), the separation d is the longitudinal distance (i.e., along the longitudinal axis 6) between filament 1 and filament 5, and δ is the latitudinal distance (i.e., perpendicular to the longitudinal axis 6) between one end B of filament 1 and the farther end D of filament 5.

Thus, the value of $M_{1,5}$ is a function of the separation d, which may be adjusted by changing the position of the second coil 20 relative to the first coil 10 (e.g., by moving the second coil 20 along and parallel to the longitudinal axis 6).

Using the example experimental methods and/or calculations described above, the positioning of the first and second coils 10, 20 (e.g., as measured by the separation d) in order to achieve substantially zero mutual inductance may be determined.

Mutual inductance values may be determined for different values of the separation d, in order to plot the mutual inductance as a function of the separation d.

Figure 6:
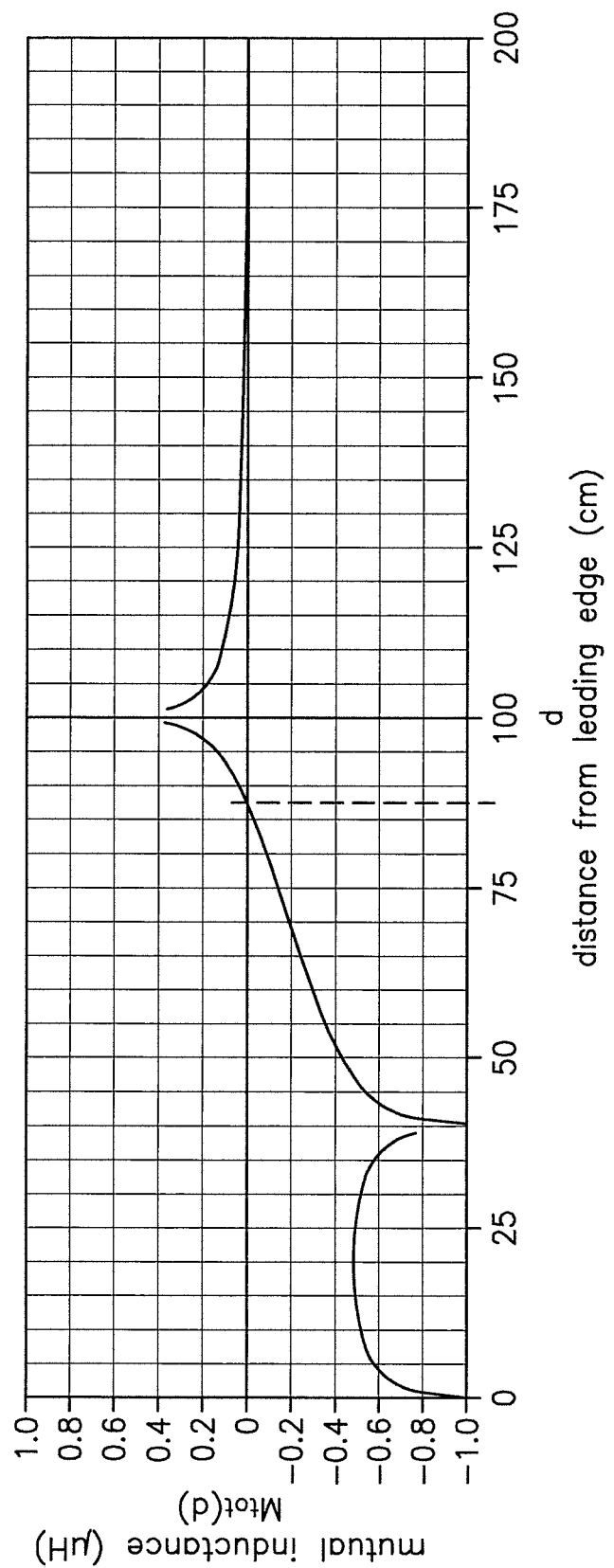
FIG. 6 is a chart showing mutual inductance between two example sensor coils.

FIG. 6 shows an example graph of mutual inductance between the first and second coils 10, 20, where the first and second coils 10, 20 are two single turn square coils of 100 cm and 60 cm per side, respectively, as a function of the separation d. In this example, a separation d at about d=86.5 cm was found to achieve substantially zero mutual inductance between the two coils 10, 20.

Similar determination of appropriate separation d and similar plotting of results may be carried out for other configurations of the first and second coils 10, 20.

Example Device

FIGS. 7A-11 illustrate an example device 100 for determining subsurface electrical conductivity. The example device 100 will be described with first and second coils 10, 20 similar to those described in the above examples, however other configurations of the first and second coils 10, 20 may be suitable.

The first and second coils 10, 20 may be coupled together (e.g., using a coupling system 30, such as an adjustable bracket with a locking screw). The first and second coils 10, 20 may be movably coupled together, such that the separation d between the first and second coils 10, 20 may be adjustable in order to achieve substantially zero mutual inductance. The device 100 may be used to carry out the experimental methods described above. For example, the coupling system 30 may enable sliding movement between the first and second coils 10, 20, such as sliding of the second coil 20 along the common longitudinal axis 6. Where the coupling system 30 includes a locking screw, the locking screw may be loosened to enable sliding of the second coil 20 and when the desired separation d is achieved the locking screw may be tightened to hold the second coil 20 in place.

Figure 8B:
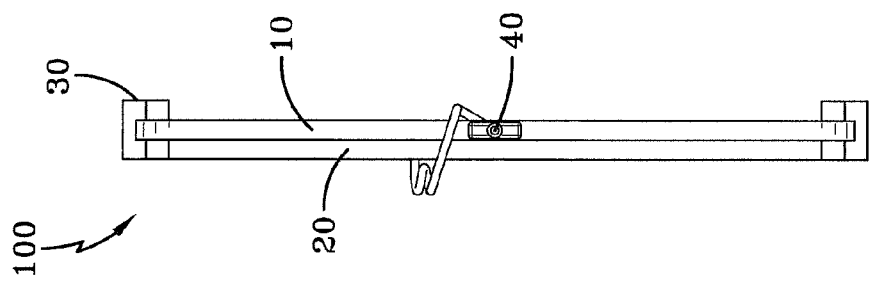
FIGS. 8A and 8B are top and side views of the example device of FIGS. 6A and 6B in a transportation or storage configuration.
Figure 8A:
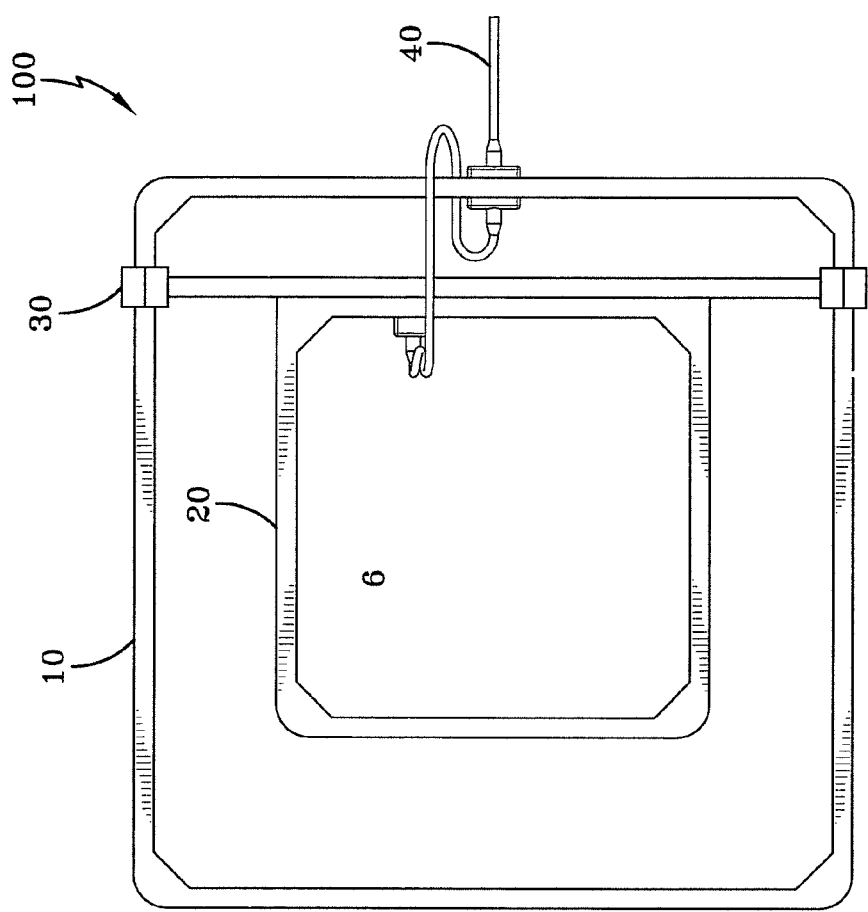

The device 100 may have an operating configuration, such as illustrated in FIGS. 7A (top view) and 7B (side view), and a storage configuration, such as illustrated in FIGS. 8A (top view) and 8B (side view). In the storage configuration, the device 100 may have a smaller footprint, which may be useful for easier storage and/or transportation of the device 100. In the storage configuration, the mutual inductance between the first and second coils 10, 20 may be non-zero; when configured in the operating configuration, the substantially zero mutual inductance between the first and second coils 10, 20 may be recovered.

Figure 9:
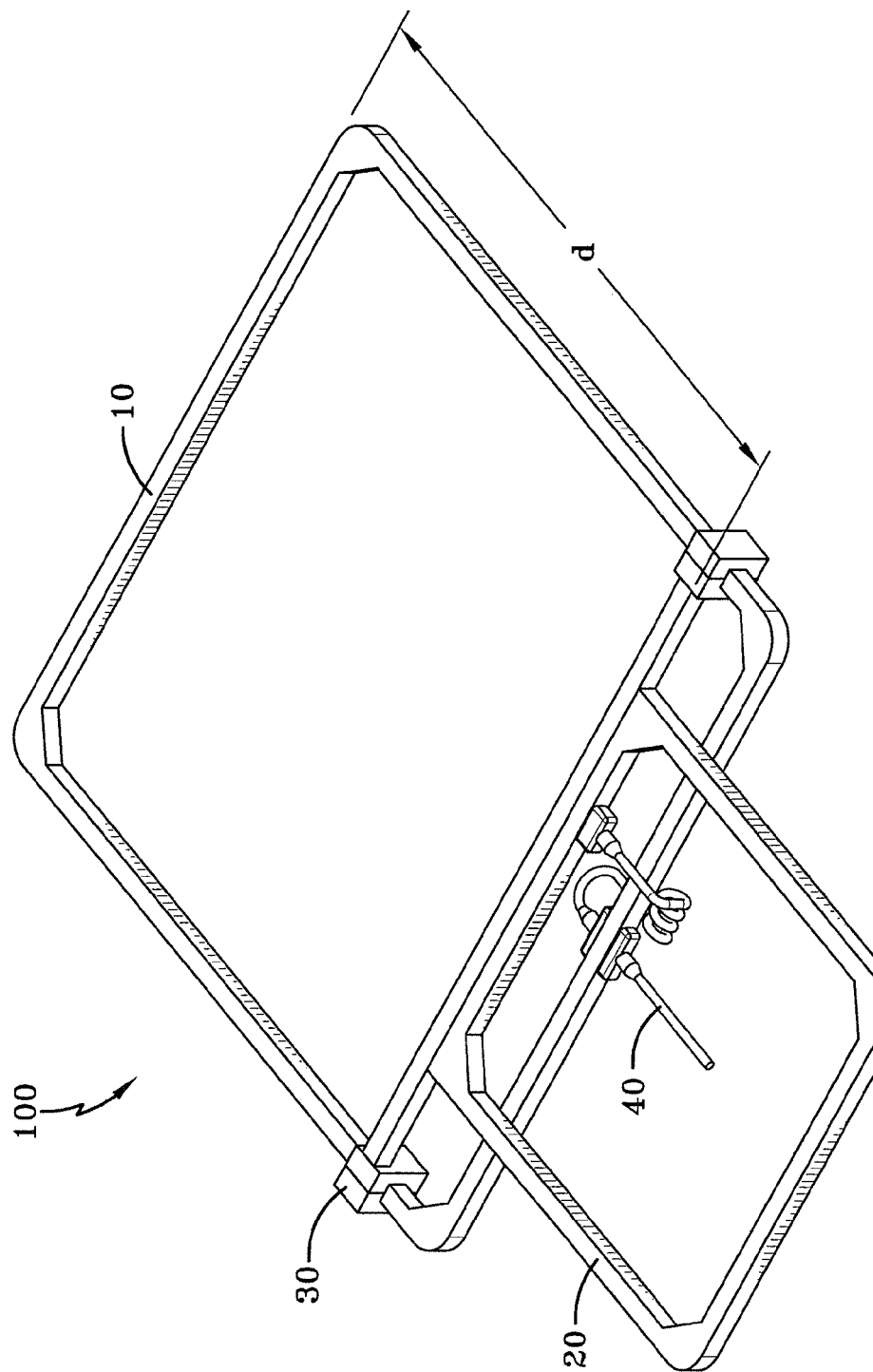
FIGS. 9-11 are perspective views of the example device of FIGS. 6A and 6B.
Figure 10:
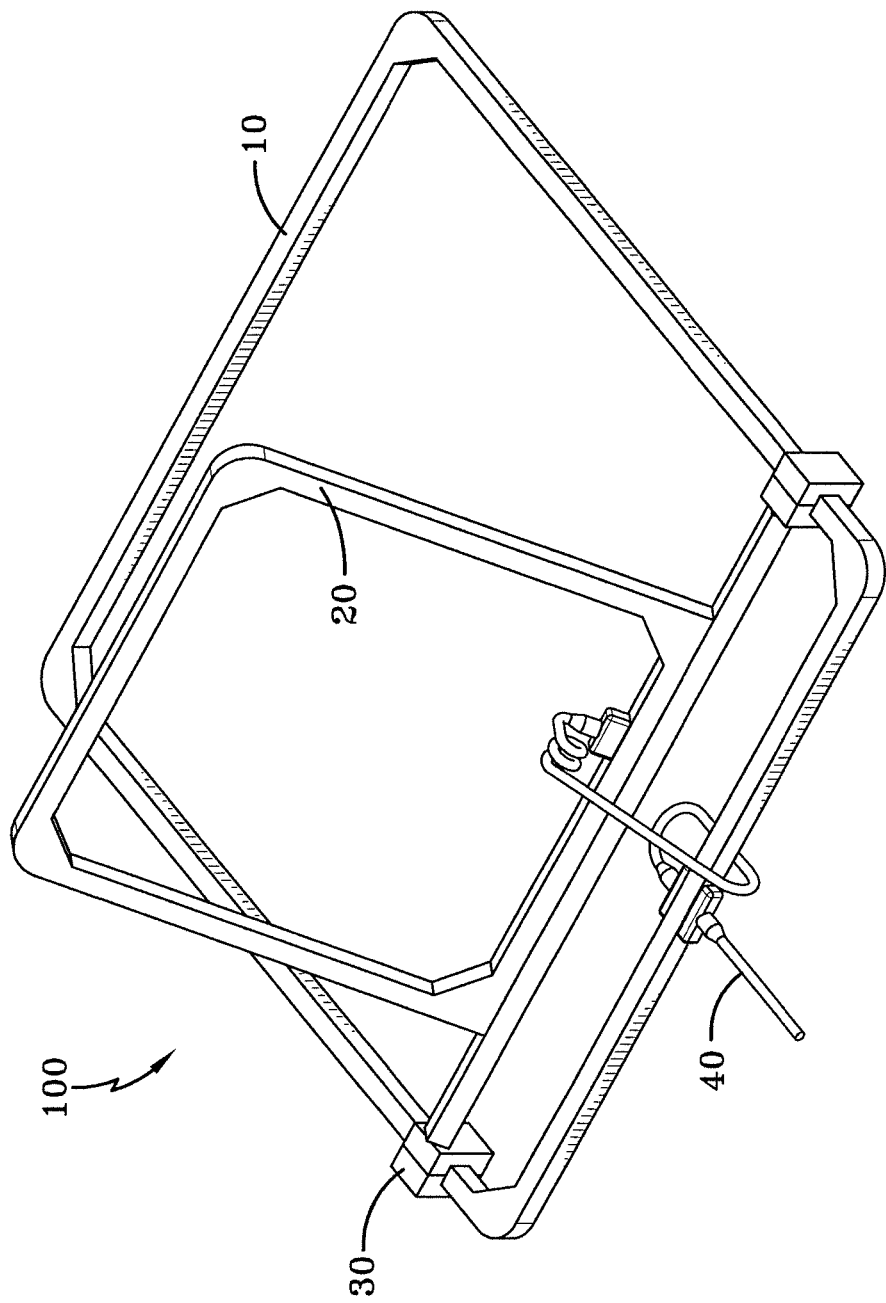
Figure 11:
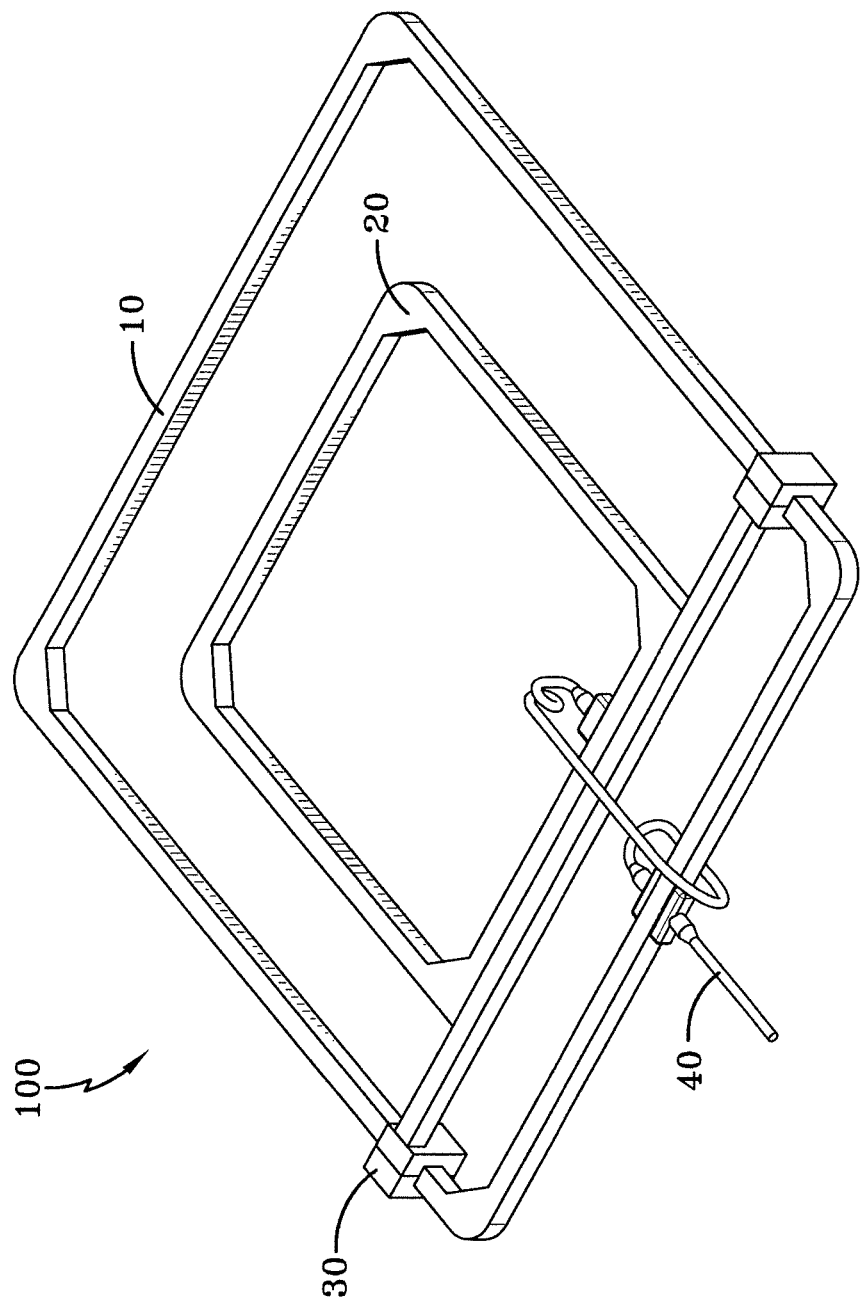

In the example shown, the coupling system 30 may enable the second coil 20 to be folded back over the first coil 10 in the storage configuration, and the second coil 20 may be flipped open to the operating configuration. The coupling system 30 may allow the second coil 20 to be rotatable about an axis defined in the plane of the first coil 10 such that the second coil 20 may be easily flipped without requiring readjustment of the separation d in the operating configuration. For example, FIG. 9 illustrates the example device 100 in the operating configuration; FIG. 10 illustrates the example device 100 with the second coil 20 in the process of being flipped to the storage configuration; and FIG. 11 illustrates the example device 100 in the storage configuration.

This arrangement may allow both coils 10, 20 to be conveniently stored and/or transported together. The device 100 may thus enable space-saving during storage and transport, and may enable the coils 10, 20 be kept conveniently together when not in use.

The device 100 may include a transmitter 40 for communicating conductivity measurements from the first and second coils 10, 20. The transmitter 40 may provide output from the first and second coils 10, 20 in the form of signals receivable by an external device (e.g., a computing device such as a laptop computer, a desktop computer or a mobile device). The transmitter 40 may enable communication of conductivity measurements from the first and second coils 10, 20 simultaneously.

The transmitter 40 may be coupled to both the first and second coils 10, 20, as in the illustrated example, while allowing the device 100 to be reconfigured between the operating and storage configurations.

The transmitter 40 may be configured for wired or wireless communication. For example, the transmitter 40 may include an antenna for wireless communication.

In some examples, the device 100 may include measurement marks or guides (not shown), such as centimeter marks along the length of the first coil 10, to assist in positioning the second coil 20 at the desired separation d.

Use of the device 100 may enable easier and/or quicker measurement of subsurface conductivity. For example, the operator may not be required to position the first and second coils 10, 20 one at a time; may not be required to take measurements from the first and second coils 10, 20 one at a time; and/or may not be required to determine the appropriate relative positioning of the first and second coils 10, 20 (e.g., the appropriate separation d) each time the coils 10, 20 are placed.

Figure 12:
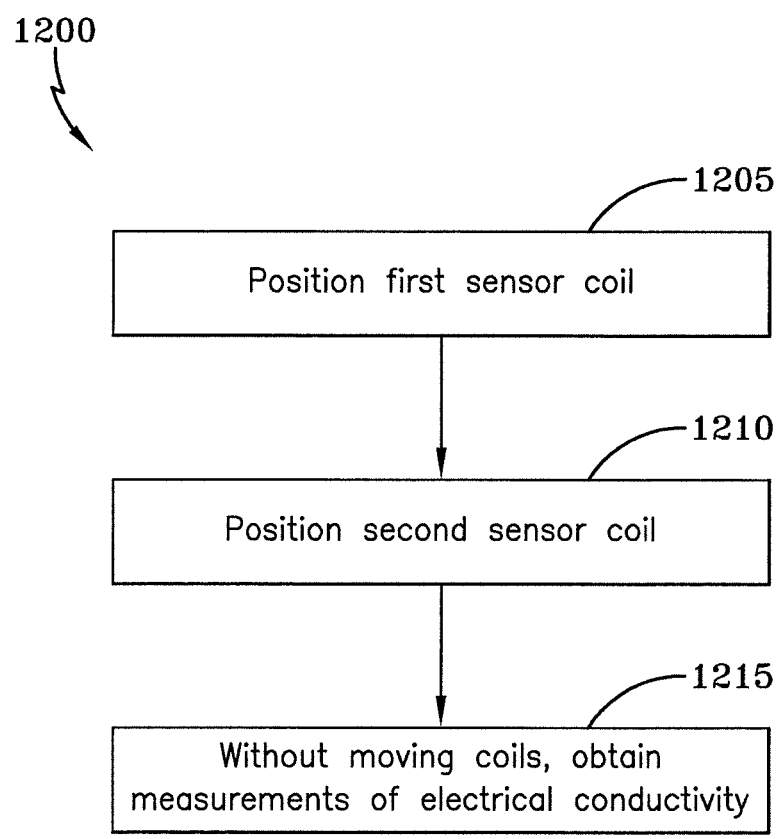
FIG. 12 is a flowchart illustrating and example method for measuring subsurface electrical conductivity.

FIG. 12 illustrates an example method 1200 for measuring subsurface electrical conductivity. The method 1200 may be carried out using the experimental and/or calculation methods described above, and/or using the example device 100.

At 1205, the first sensor coil 10 is positioned to measure the electrical conductivity of a target site (e.g., positioned over a ground surface).

At 1210, the second sensor coil 20 is positioned to measure the electrical conductivity of the target site. The second coil 20 may be positioned overlapping the first coil 10, with a separation d such that mutual inductance is zero or near zero. The coils 10, 20 may be positioned to share the common longitudinal axis 6 passing through the respective centers of each coil 10, 20. Positioning the second coil 20 may include adjusting the relative positions of the first and second coils 10, 20, such as using the experimental methods described above. Adjusting the relative positions of the first and second coils 10, 20 may include moving one of the coils 10, 20 along the common longitudinal axis 6, as described above. It will be appreciated that in some example embodiments, the coils 10, 20 may not require a common longitudinal axis 6.

Where the appropriate separation d is already known (e.g., previously determined experimentally or through calculations), the second coil 20 may be directly positioned at the appropriate position overlapping the first coil 10, with little or no further adjusting required.

1205 and 1210 may occur simultaneously. For example, where the device 100 is used, placing the device 100 in the operating configuration over the target site may simultaneously position both the first and second coils 10, 20. Alternatively, the device 100 may be placed in the storage configuration to position the first coil 10 over the target site and subsequently the second coil 20 may be flipped open to position the second coil 20 over the target site.

In some examples, the second sensor coil 20 may be positioned before the first sensor coil 10.

At 1215, without moving the coils 10, 20, measurements of electrical conductivity may be obtained from the first and second coils 10, 20. The measurements may be obtained simultaneously and/or in turn from the first and second coils 10, 20.

For example, where the device 100 is used, measurements may be obtained from the coils 10, 20 using the transmitter 40.

Although the method 1200 is illustrated as having certain steps, this is only exemplary. Other steps and substeps may be included. Alternatively, one or more steps or substeps may be excluded. The steps and substeps may occur in an order different from that shown. The method 1200 may be carried out using any suitable apparatus, and measurements may be taken using any appropriate electrical device.

It will be appreciated that example device 100 having coils 10, 20 can be used in both active and passive geophysical surveying systems to measure secondary fields. In an active system, the device 100 can be combined with a primary field generating transmitter that actively generates a square wave (in the case of an active time domain system) or a continuous wave such as a sine wave (in the case of a frequency domain system). In a passive system, the device 100 can be used without an active transmitter to measure naturally occurring secondary fields. Examples of active and passive geophysical surveying systems to which the presently described receiver system can be applied are described for example in Geonics Technical Note TN-27 "Principles and Application of Time Domain Electromagnetic Techniques for Resistivity Sounding"

In this regard, FIG. 13 schematically illustrates an active electromagnetic surveying apparatus that incorporates the dual receiver coil device 100 with a transmitter coil 1300. A transmitter driver 1302 is configured to drive the transmitter coil 1300 with either a pulsed signal (in a time domain system) or a continuous wave (in a frequency domain system) to generate a primary field, the secondary field of which is measured by device 100.

The embodiments of the present disclosure described above are intended to be examples only. The present disclosure may be embodied in other specific forms. Alterations, modifications and variations to the disclosure may be made without departing from the intended scope of the present disclosure. While the systems, devices and processes disclosed and shown herein may comprise a specific number of elements/components, the systems, devices and assemblies could be modified to include additional or fewer of such elements/components. For example, while any of the elements/components disclosed may be referenced as being singular, the embodiments disclosed herein could be modified to include a plurality of such elements/components. Selected features from one or more of the above-described embodiments may be combined to create alternative embodiments not explicitly described. All values and subranges within disclosed ranges are also disclosed. The subject matter described herein intends to cover and embrace all suitable changes in technology. All references mentioned are hereby incorporated by reference in their entirety.

The invention claimed is:

1. A device for measuring subsurface electrical conductivity, the device comprising:
   a first sensor coil having a first effective area and a first bandwidth;
   a second sensor coil having a second effective area smaller than the first effective area and a second bandwidth greater than the first bandwidth;
   wherein the second sensor coil is coupled to the first sensor coil at a position having an amount of overlap with the first coil and at a position where mutual inductance between the first and second sensor coils is substantially zero; and
   further comprising a transmitter coil for generating a primary field, wherein the first sensor coil and the second sensor coil are configured to measure a resulting secondary field generated by a subsurface.

2. The device of claim 1 wherein the second sensor coil is moveably coupled to the first sensor coil for adjusting the amount of overlap between the first and second sensor coils.

3. The device of claim 2 wherein the second sensor coil is flappable from the storage configuration of the device to the operating configuration of the device.

4. The device of claim 2 wherein the second sensor coil is slideably moveable relative to the first sensor coil.

5. The device of claim 1 wherein each of the first and second sensor coils is a square coil.

6. The device of claim 1 further comprising a transmitter for communicating measurements of electrical conductivity from each of the first and second sensor coils.

7. A device for measuring subsurface electrical conductivity, the device comprising:
   a first sensor coil having a first effective area and a first bandwidth;
   a second sensor coil having a second effective area smaller than the first effective area and a second bandwidth greater than the first bandwidth;
   wherein the second sensor coil is coupled to the first sensor coil at a position having an amount of overlap with the first coil and at a position where mutual inductance between the first and second sensor coils is substantially zero;
   wherein the second sensor coil is moveably coupled to the first sensor coil for adjusting the amount of overlap between the first and second coils; and
   wherein the second sensor coil is moveable from a storage configuration of the device where the device has a reduced footprint and the mutual inductance between the first and second sensor coils is substantially non-zero, to an operating configuration of the device where the mutual inductance between the first and second coils is substantially zero.

8. A device for measuring subsurface electrical conductivity, the device comprising:
a first sensor coil having a first effective area and a first bandwidth;
a second sensor coil having a second effective area smaller than the first effective area and a second bandwidth greater than the first bandwidth;
wherein the second sensor coil is coupled to the first sensor coil at a position having an amount of overlap with the first coil and at a position where mutual inductance between the first and second sensor coils is substantially zero;
wherein the second sensor coil is moveably coupled to the first sensor coil for adjusting the amount of overlap between the first and second sensor coils;
wherein the second sensor coil is slideably moveable relative to the first sensor coil; and
wherein a common longitudinal axis is shared by the first and second sensor coils, the longitudinal axis passing through respective centers of the first and second sensor coils, and wherein the second sensor coil is moveable along the common longitudinal axis.

9. A method of measuring subsurface electrical conductivity of a target site, the method comprising:
positioning a first sensor coil to measure electrical conductivity of the target site, the first sensor coil having a first effective area and a first bandwidth; positioning a second sensor coil to measure electrical conductivity of the target site, the second sensor coil having a second effective area smaller than the first effective area and a second bandwidth greater than the first bandwidth; the first and second sensor coils being positioned with respect to each other to reduce mutual inductance between the first and second sensor coils to substantially zero; while keeping both the first and second sensor coils in position, obtaining measurements of electrical conductivity from the first and second sensor coils, wherein one of the first and second sensor coils is firstly positioned and the other of the first and second sensor coils is secondly positioned, the secondly positioning comprising adjusting overlap between the first and second sensor coils to achieve substantially zero mutual inductance.

10. The method of claim 9 wherein the measurements of electrical conductivity are obtained simultaneously from both the first and second sensor coils.

11. The method of claim 9 wherein the first and second sensor coils are positioned to at least partially overlap.

12. The method of claim 9 wherein the first and second sensor coils are coupled to each other.

13. The method of claim 9 wherein the first and second sensor coils are positioned at the same time.

14. The method of claim 9 wherein the second sensor coil is positioned prior to positioning of the first sensor coil.

15. The method of claim 9 wherein the secondly positioning comprises positioning the other of the first and second sensor coil to share a common longitudinal axis with the one of the first and second sensor coils, the common longitudinal axis passing through respective centers of the first and second sensor coils, and wherein adjusting overlap comprises moving the other of the first and second sensor coils along the common longitudinal axis.

16. The method of claim 9 wherein the secondly positioning comprises:
applying an input signal to the one of the first and second sensor coils;
measuring an output signal from the other of the first and second sensor coils; and
adjusting overlap between the first and second sensor coils until there is substantially zero output signal from the other of the first and second sensor coils.

17. The method of claim 9 further comprising:
prior to the secondly positioning, measuring an initial inductance of one of the one and the other of the first and second sensor coils;
wherein the secondly positioning comprises adjusting overlap between the first and second sensor coils until measured inductance of the one of the one and the other of the first and second sensor coils substantially equals the initial inductance.

18. The method of claim 9 wherein the first and second coils are positioned to share a common longitudinal axis passing through respective centers of the first and second coils.

19. A method of measuring subsurface electrical conductivity of a target site, the method comprising:
positioning a first sensor coil to measure electrical conductivity of the target site, the first sensor coil having a first effective area and a first bandwidth;
positioning a second sensor coil to measure electrical conductivity of the target site, the second sensor coil having a second effective area smaller than the first effective area and a second bandwidth greater than the first bandwidth;
the first and second sensor coils being positioned with respect to each other to reduce mutual inductance between the first and second sensor coils to substantially zero;
while keeping both the first and second sensor coils in position, obtaining measurements of electrical conductivity from the first and second sensor coils,
wherein the first and second coils are positioned to share a common longitudinal axis passing through respective centers of the first and second coils.

* * * * *